June 30, 1931.   M. H. TONCRAY   1,812,067
VEHICLE SEAT
Filed Feb. 9, 1928
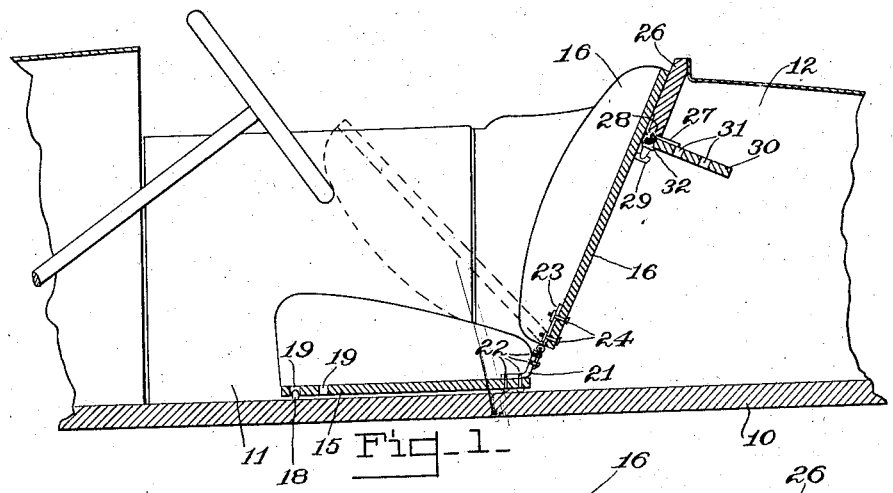
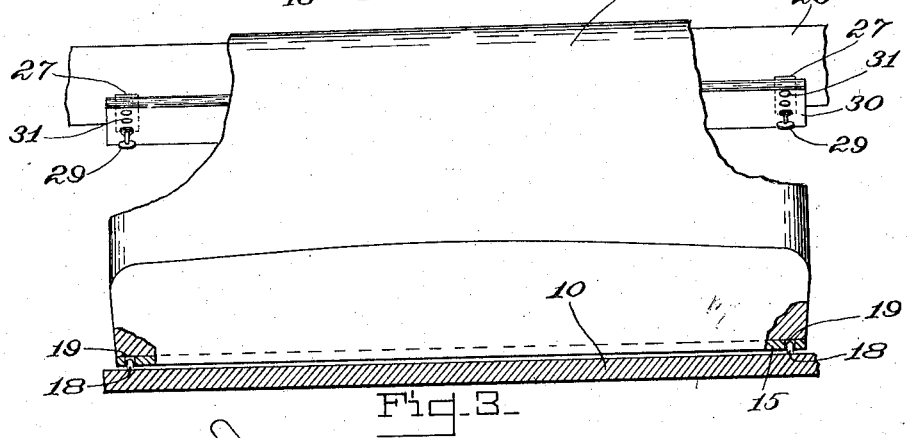
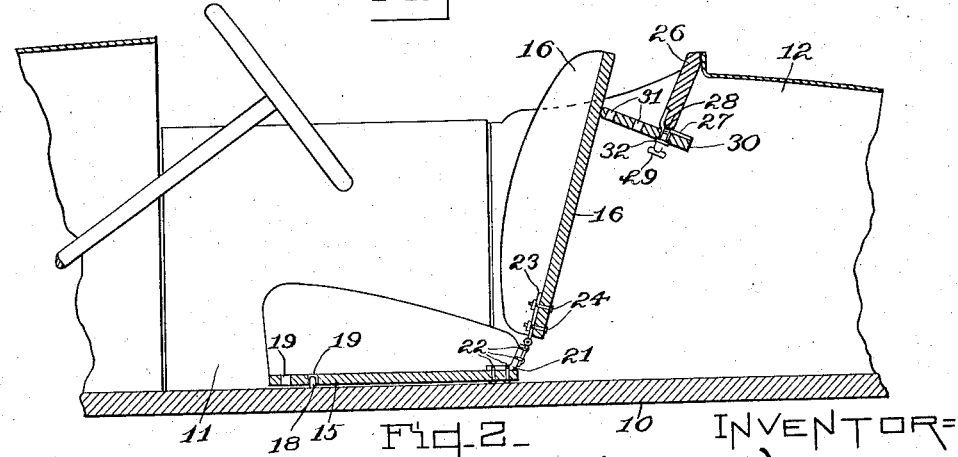
INVENTOR
Millard H. Toncray.
By MacLeod, Calver, Copeland & Dike
ATTORNEYS Patented June 30, 1931

1,812,067

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

VEHICLE SEAT

Application filed February 9, 1928. Serial No. 253,067.

This invention relates to automobile bodies and particularly, although not exclusively, to the type of automobile body commonly known as a roadster.

The invention has for its objects to provide a seat assembly which can be readily removed from the body as a unit to afford convenient access to a storage compartment in the rear of the passenger compartment and for other purposes, to provide a seat unit which can be variably positioned in the body to conform to the comfort and convenience of the user, and to provide simple and effective means whereby the inclination of the seat back to the seat bottom can also be readily adjusted.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The invention will be more clearly understood from the following description in conjunction with the accompanying drawings, in which:

Figs. 1 and 2 are longitudinal sectional views of an automobile body embodying the invention and illustrating different positions of adjustment of the seat; and Fig. 3 is a front elevation of the seat, partly broken away.

The automobile body illustrated comprises a floor 10 which is supported upon suitable body sills (not shown) and which support suitable body panels shaped to provide a passenger compartment 11 and a closed storage compartment 12. A seat comprising a seat bottom 15 and a seat back 16 is positioned within the passenger compartment by dowels or studs 18 projecting from the floor 10 at each side of the seat and adapted to engage any corresponding openings 19 of a series at each side in the seat bottom 15, whereby said seat bottom may be adjustably positioned longitudinally of the body. The seat bottom 15 and the seat back 16 are pivotally secured together by a suitable hinge comprising a hinge member 21 secured to the rear edge of the seat bottom, as by rivets 22, and cooperating with a hinge member 23 secured to the lower edge of the seat back, as by bolts 24. A ledge 26 is secured to the body at the edge of the storage compartment in any suitable manner and is provided at its free edge near the ends thereof with brackets 27 each having a threaded opening 28 adapted to receive a thumb screw 29. An adjustable support 30 is suitably secured to the brackets 27 and for this purpose is provided near each end with a plurality of openings 31 through which the thumb screws 29 are adapted to pass, the latter being provided with shoulders 32 adapted to engage the lower surface of the support. The hinged seat back 16 rests or leans against the support 30 which thereby fixes its inclination with respect to the seat bottom 15 by supporting it against rearward movement about its hinge.

Access to the storage compartment may be gained by turning the seat back 16 to the position shown in dotted lines in Fig. 1 or by wholly removing the seat as a unit. The seat may be adjusted to a position suitable for the driver by bringing the dowel or studs 18 into engagement with any desired corresponding openings 19 and in addition, if necessary, by moving the support 30 from the position shown in Fig. 1 to that shown in Figs. 2 and 3 or to an intermediate position by the removal and insertion of the thumb screw 29 through the proper opening 31 and into the threaded opening 28. It will be seen that the inclination of the seat back to the seat bottom is determined by the longitudinal position of said bottom with relation to the support 30, so that, by adjusting the latter as well as the seat bottom, a considerable variety of seating positions, both as to the position of the seat as a whole in the body and as to the inclination of the back, is obtainable.

What I claim is:

1. In a vehicle body, in combination, an open passenger compartment and a closed storage compartment, a ledge projecting from the edge of said storage compartment, a seat detachable as a unit from said passenger compartment and having a seat bottom and a seat back pivotally secured together, said seat bottom having openings therein, studs on the floor of said body adapted to engage said openings, and an adjustable support on said ledge adapted to engage said seat back.

2. In a vehicle body, in combination, a passenger compartment and a storage compartment, a ledge projecting from the edge of said storage compartment, a seat in said passenger compartment having a seat bottom and a seat back pivotally connected, a support adapted to engage said seat back and provided with a plurality of openings, and a thumb screw adapted to pass through one of said openings and engage said ledge.

3. The combination with a vehicle body having a passenger compartment and a storage compartment in the rear of said passenger compartment and communicating therewith but otherwise permanently closed to the exterior of the body, of a seat removable as a unit from said passenger compartment and comprising a seat bottom and a seat back hinged at its lower edge to the rear edge of said seat bottom, means for adjustably positioning said seat bottom longitudinally of said body, a ledge positioned at the upper forward edge of said storage compartment, and a support against which said seat back rests, said support being carried by said ledge and being adjustable thereon longitudinally of said body, whereby said seat, when in position in said passenger compartment, closes communication between said compartments, and whereby the inclination of said seat back to said seat bottom is determined by the relative longitudinal position of said seat bottom and support.

In testimony whereof I affix my signature.

MILLARD H. TONCRAY.